United States Patent
Andrews et al.

(10) Patent No.: US 10,228,751 B2
(45) Date of Patent: Mar. 12, 2019

(54) LOW POWER MODE

(71) Applicant: Apple Inc., Cupertino, CA (US)

(72) Inventors: Jonathan J. Andrews, Los Altos Hills, CA (US); Cyril De La Cropte De Chanterac, San Francisco, CA (US); Eugene Kim, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/799,370

(22) Filed: Jul. 14, 2015

(65) Prior Publication Data

US 2016/0041606 A1 Feb. 11, 2016

Related U.S. Application Data

(60) Provisional application No. 62/033,819, filed on Aug. 6, 2014, provisional application No. 62/034,103, filed on Aug. 6, 2014.

(51) Int. Cl.
*G06F 1/32* (2006.01)
*G06F 1/3296* (2019.01)
(Continued)

(52) U.S. Cl.
CPC .......... *G06F 1/3296* (2013.01); *G06F 1/3212* (2013.01); *G06F 9/4401* (2013.01);
(Continued)

(58) Field of Classification Search
CPC .... G06F 1/3296; G06F 9/4401; G06F 1/3212; G06F 1/3203
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |

(Continued)

FOREIGN PATENT DOCUMENTS

| | | |
|---|---|---|
| EP | 2 610 701 A1 | 7/2013 |
| EP | 2 610 701 A9 | 7/2013 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Jaweed A Abbaszadeh
*Assistant Examiner* — Gayathri Sampath
(74) *Attorney, Agent, or Firm* — Morrison and Foerster LLP

(57) ABSTRACT

Examples of the disclosure are directed to a method of, after hitting a UVLO threshold, rebooting an electronic device in a low power mode having a lower UVLO threshold, such that the device can continue to be used past the first UVLO threshold. For example, in a high power mode, the device may be capable of a number of functionalities of a modern portable electronic device, such as network access, the ability to run applications, Bluetooth connections, etc. In a low power mode, the device may only be able to check and display a current time, play an alarm sound at a predefined time, perform near field communication (NFC) transactions/payments, among other possibilities described herein. The limited functionality and reduced usage of peripherals in the low power mode may prevent the battery from experiencing peaks in current level that may be problematic at relatively low levels of voltage.

27 Claims, 7 Drawing Sheets

(51) Int. Cl.
*G06F 1/3212* (2019.01)
*G06F 9/4401* (2018.01)

(52) U.S. Cl.
CPC ....... *Y02B 60/1285* (2013.01); *Y02B 60/1292* (2013.01); *Y02B 60/32* (2013.01); *Y02D 10/172* (2018.01); *Y02D 10/174* (2018.01); *Y02D 50/20* (2018.01)

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,498,460 B1 | 12/2002 | Atkinson | |
| 6,690,387 B2 | 2/2004 | Zimmerman et al. | |
| 6,809,724 B1 | 10/2004 | Shiraishi et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,121,656 B2 | 2/2012 | Imai | |
| 8,271,057 B2 | 9/2012 | Levine et al. | |
| 8,335,549 B2 | 12/2012 | Lee | |
| 8,395,518 B2 | 3/2013 | Toba | |
| 8,479,122 B2 | 7/2013 | Hotelling et al. | |
| 8,639,291 B1 | 1/2014 | Gailloux et al. | |
| 8,686,682 B2 | 4/2014 | Eager et al. | |
| 2002/0181333 A1* | 12/2002 | Ito .................. | G04G 9/0076 368/21 |
| 2004/0070371 A1 | 4/2004 | Chern et al. | |
| 2004/0070511 A1 | 4/2004 | Kim | |
| 2006/0197753 A1 | 9/2006 | Hotelling | |
| 2007/0239920 A1* | 10/2007 | Frid .................. | G06F 13/4282 710/306 |
| 2008/0079589 A1 | 4/2008 | Blackadar | |
| 2010/0081485 A1* | 4/2010 | Velhal ............... | H04W 52/0251 455/574 |
| 2010/0313042 A1* | 12/2010 | Shuster ............. | G06F 1/3203 713/300 |
| 2011/0059769 A1 | 3/2011 | Brunolli | |
| 2011/0154007 A1* | 6/2011 | Juvonen ............. | G06F 1/3212 713/2 |
| 2011/0246801 A1* | 10/2011 | Seethaler .......... | G06F 1/3218 713/323 |
| 2011/0260691 A1* | 10/2011 | Ishibashi ........... | B60L 11/1842 320/134 |
| 2011/0316769 A1 | 12/2011 | Boettcher et al. | |
| 2012/0047380 A1* | 2/2012 | Nurmi ............... | G06F 1/3203 713/320 |
| 2012/0096373 A1* | 4/2012 | Aguera Y Arcas ... | G06F 1/1645 715/764 |
| 2012/0185684 A1* | 7/2012 | Lee .................. | G06F 1/263 713/2 |
| 2012/0239949 A1 | 9/2012 | Kalyanasundaram et al. | |
| 2013/0244633 A1 | 9/2013 | Jacobs et al. | |
| 2014/0015682 A1* | 1/2014 | Ratzlaff ............ | G08B 21/182 340/636.1 |
| 2014/0075220 A1 | 3/2014 | Song | |
| 2015/0007049 A1 | 1/2015 | Langlois | |
| 2015/0102992 A1 | 4/2015 | Klement et al. | |
| 2015/0148109 A1 | 5/2015 | Gupta et al. | |
| 2015/0185849 A1 | 7/2015 | Levesque et al. | |
| 2016/0041597 A1 | 2/2016 | Graham et al. | |
| 2016/0062540 A1 | 3/2016 | Yang et al. | |
| 2016/0066278 A1 | 3/2016 | Zhao et al. | |
| 2016/0187432 A1 | 6/2016 | Masakawa | |
| 2016/0299551 A1 | 10/2016 | Wu et al. | |

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action dated Mar. 23, 2017, for U.S. Appl. No. 14/817,572, filed Aug. 4, 2015, 13 pages.

International Search Report dated Jan. 29, 2016, for PCT Patent Application No. PCT/US2015/043487, eight pages.

Non-Final Office Action dated Sep. 12, 2016, for U.S. Appl. No. 14/817,572, filed Aug. 4, 2015, eight pages.

Danish Search Report dated Apr. 20, 2017, for Application No. PA 2017 70089, eight pages.

Notice of Allowance dated Nov. 30, 2017, for U.S. Appl. No. 14/817,572, filed Aug. 4, 2015, 26 pages.

* cited by examiner

LOW POWER MODE

CROSS-REFERENCE TO RELATED APPLICATIONS

This application is related to and claims the benefit of U.S. Provisional Application Ser. No. 62/033,819, filed Aug. 6, 2014, entitled "Low Power Mode", and to U.S. Provisional Application Ser. No. 62/034,103, filed Aug. 6, 2014, entitled "Reduced-Size User Interfaces for Battery Management," the entire disclosure of which is herein incorporated by reference in their entirety for all purposes.

FIELD OF THE DISCLOSURE

This relates generally to power management of an electronic device.

BACKGROUND OF THE DISCLOSURE

An electronic device may require a power supply, such as a battery. Further, the electronic device may require that the power supply have a certain minimum voltage in order to function properly. For example, a battery may not be able to sustain peaks in current level when the voltage drops below a certain level. Accordingly, an electronic device may monitor the voltage of its power supply and power down when the voltage falls below threshold.

SUMMARY OF THE DISCLOSURE

An electronic device may include a power supply, such as a battery. If the electronic device is powered down, e.g., when the voltage falls to an undervoltage lockout (UVLO) threshold, a portion of the battery's capacity may remain unused.

Examples of the disclosure are directed to a method of, after hitting a voltage threshold, such as an UVLO threshold, rebooting an electronic device in a low power mode having a different, lower UVLO threshold, such that the device can continue to be used. For example, in a high power mode, the device may be capable of a number of functionalities of a modern portable electronic device, such as network access, the ability to run applications, Bluetooth connections, etc. In a low power mode, the device may be enabled for a limited set of functions. For example, the device may only be able to check and display a current time, play an alarm sound at a predefined time, perform near field communication (NFC) transactions/payments, among other possibilities described herein. The limited functionality and reduced usage of peripherals in the low power mode may prevent the battery from experiencing peaks in current level that may be problematic at relatively low levels of voltage. Operation in a lower power mode also may extend the useful operation of an electronic device. An electronic device may be any electronic device such as a desktop computer, portable multifunction device (e.g., a smartphone), wearable device, tablet computer, etc.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Examples of the disclosure are directed to a method of, after hitting a voltage threshold, rebooting an electronic device in a low power mode having a lower voltage threshold, such that the device can continue to be used. An undervoltage lockout (UVLO) threshold is presented for the sake of example, but other and/or additional thresholds can be used. For example, in a high power mode, the device may be capable of a number of functionalities of a modern portable electronic device, such as network access, the ability to run applications, Bluetooth connections, etc. In a low power mode, the device may only be able to perform a limited set of functions, e.g., check and display a current time, play an alarm sound at a predefined time, perform near field communication (NFC) transactions/payments, among other possibilities described herein. The limited functionality and reduced usage of peripherals in the low power mode may prevent the battery from experiencing peaks in current level that may be problematic at relatively low levels of voltage. An electronic device may be any electronic device such as a desktop computer, portable multifunction device (e.g., a smartphone), wearable device, tablet computer, etc.

Figure 1:
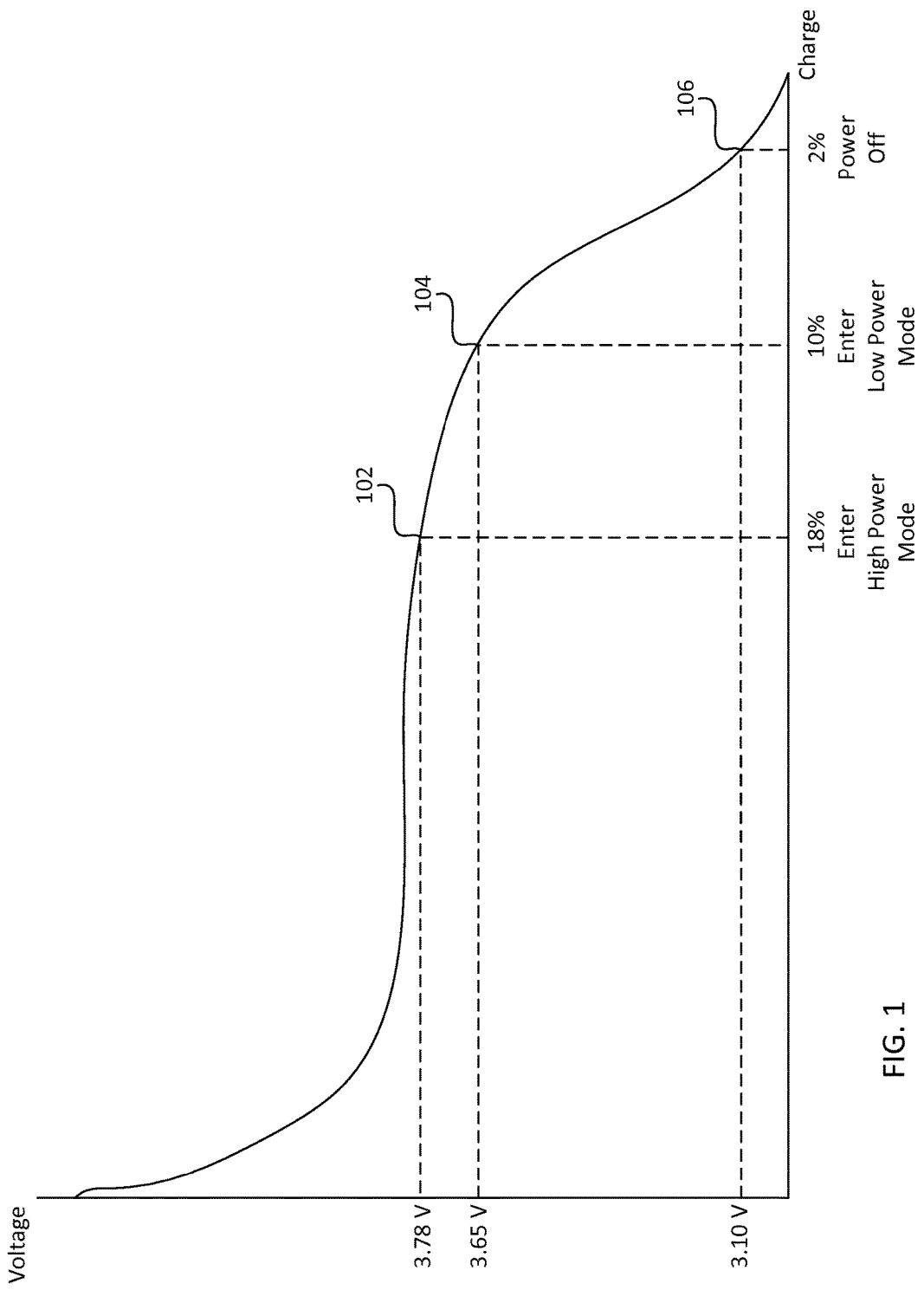
FIG. 1 is a graph illustrating an exemplary power discharge of an electronic device, according to examples of the disclosure.

FIG. 1 is a graph illustrating an exemplary power discharge of an electronic device, according to examples of the disclosure. In this example, the electronic device may cease to function properly at a first threshold voltage level (104) (e.g., a high power mode UVLO level), 3.65 volts (V). However, the 3.65 V level may be reached when the battery still holds 10% of its charge capacity. Rather than let this charge capacity go unused, examples of the disclosure describe a low power mode, with a reduced set of functionality, that can thereby function at lower voltage levels. This low power mode can have a lower UVLO threshold (e.g., a low power mode UVLO level). For example, FIG. 1 illustrates a low power mode UVLO threshold (106) of 3.10 V, corresponding to a 2% battery charge. In this example, enabling low power mode can allow usage of an additional 8% of the device's battery charge. Further, the device may require a higher charge level before it re-enters high power mode from low power mode, so that in the high power mode the electronic device does not immediately encounter the first threshold again and the electronic device powers off. For example, FIG. 1 illustrates a high power mode re-entry threshold (102) of 3.78 V, corresponding to an 18% battery charge.

In one example, a device may be used in a high power mode until the charge reaches 10% (an example value of the first threshold described below), at which point the device may reboot in low power mode. In this mode, the device may be used to display a current time (and other limited functionality). Then, if the device is recharged to at least 18% (an example value of the second threshold described below), then the device may reboot in the high power mode with all normal functionality enabled. However, if the device continues to be used in the low power mode (e.g., to display a current time) until the charge reaches 2% (an example value of the third threshold described below), the device may power off completely (and be unable to power on until sufficiently recharged).

Figure 2A:
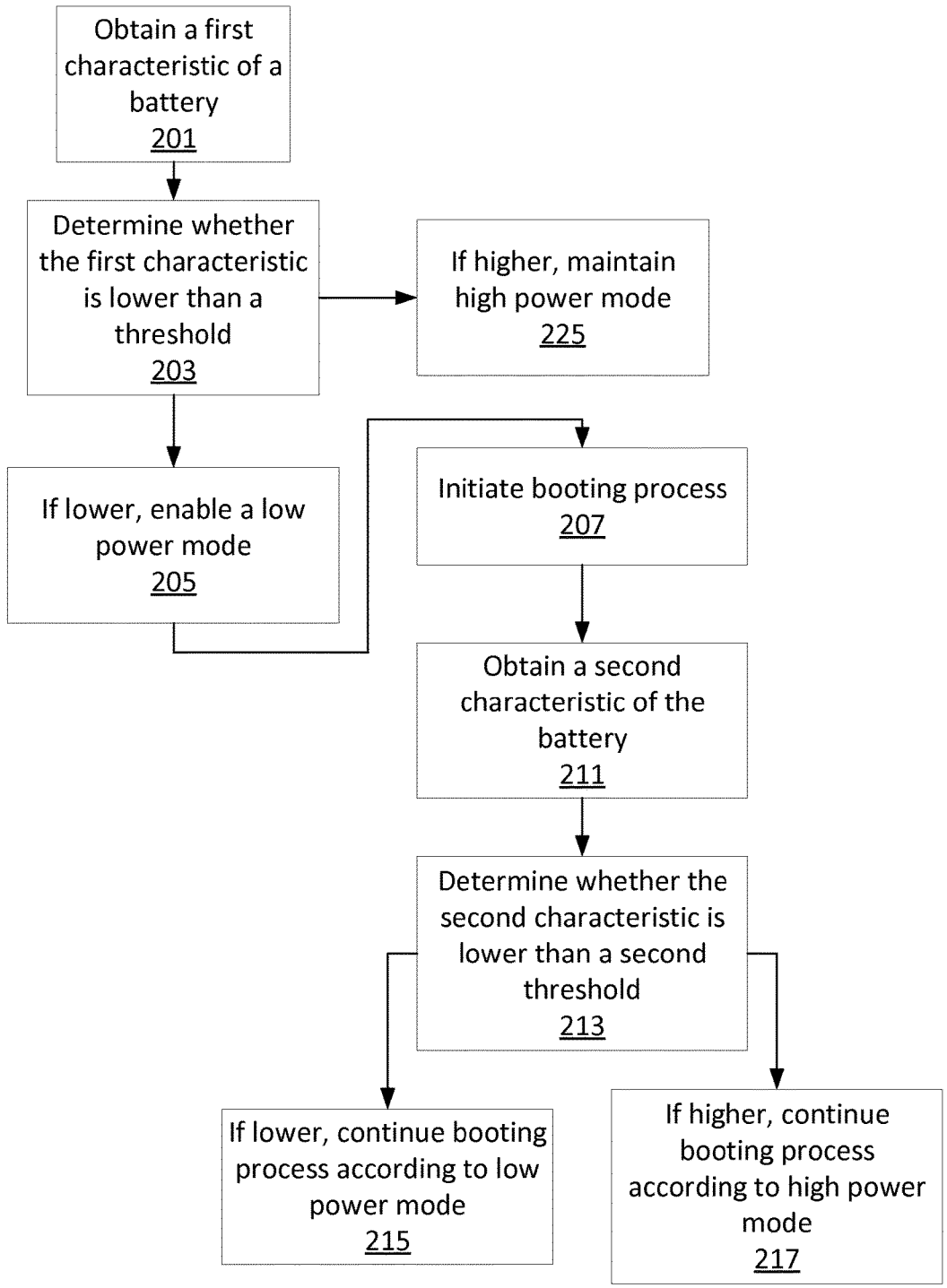
FIGS. 2A and 2B illustrate an exemplary method of managing a low power mode of an electronic device, according to examples of the disclosure.

FIG. 2A illustrates an exemplary method of managing a low power mode of an electronic device, according to examples of the disclosure. The method may be performed at an electronic device including a battery.

A first characteristic of the battery (e.g., a voltage level, a charge level, or some other measure that may relate to the remaining capacity of the battery) may be obtained (201), and it may be determined (203) whether the first characteristic is lower than a first threshold (e.g., an undervoltage-lockout (UVLO) threshold).

In accordance with a determination that the first characteristic is higher than the first threshold, a high power mode may be maintained (225). In accordance with a determination that the first characteristic is lower than the first threshold, a low power mode may be enabled (e.g., by setting a low power mode flag) (205). In some examples, enabling the low power mode may include setting a low power mode flag before powering off or rebooting the electronic device, storing a local time offset (e.g., an offset from coordinated universal time (UTC)), and storing an alarm time. Further, in some examples, in the low power mode, a current time may be obtained, the local time offset may be applied to the current time to obtain a local time, and the local time may be displayed. It may be determined that the current time is the alarm time, and, in accordance with a determination that the current time is the alarm time, an alarm sound may be played, the display may indicate that an alarm is going off, and/or the device may vibrate.

In some examples, enabling the low power mode may include storing authorization information for performing NFC transactions/payments (e.g., storing encryption keys, credit card numbers, passwords, etc.). Further, in some examples, in the low power mode, an NFC module may communicate some or all of the authorization information to perform or receive a mobile payment.

A booting process may be initiated (207) (e.g., a booting process may be initiated following a reboot or power cycle of the electronic device; the electronic device may force a power off and/or reboot in accordance with a determination that the first characteristic is lower than the first threshold). For example, after a reboot or power cycle, the device may initialize itself and load a boot loader, which, in some examples, may then load either a low power mode firmware image or a high power mode firmware image (as discussed below with reference to 215 and 217).

As part of the booting process, a second characteristic of the battery may be obtained (211) (e.g., a voltage level, a charge level, or some other measure that may relate to the remaining capacity of the battery). It may be determined whether the second characteristic is lower than a second threshold (213) (e.g., a UVLO threshold or a threshold higher than the UVLO threshold). In some examples, the second threshold may be different from the first threshold (e.g., higher, so that in the high power mode the electronic device does not immediately encounter the first threshold again and the electronic device powers off).

In accordance with a determination that the second characteristic is lower than the second threshold, the electronic device may continue the booting process according to the low power mode (215). For example, the boot loader may load a firmware image corresponding to the low power mode. In some examples, the low power mode firmware image may only enable certain functionality/drivers (e.g., displaying time) and other drivers are not loaded (e.g., the low power mode firmware image may include an operating system having relatively limited functionality, as further described below). In accordance with a determination that the second characteristic is higher than the second threshold, the electronic device may continue the booting process according to a high power mode (217). For example, the boot loader may load a firmware image corresponding to the high power mode (e.g., a high power mode firmware image may include an operating system having relatively expansive functionality compared to an operating system of a low power mode firmware image, as further described below).

In some examples, in the low power mode, only a subset of modules of the electronic device may be powered on (e.g., only powering on the display, touch controller, central processing unit (CPU), near field communications (NFC), and/or speaker, among other possibilities). Further, in the high power mode, the subset of modules of the electronic device and on one or more additional modules of the electronic device (e.g., graphics processing unit (GPU), microphone, Wi-Fi controller, Bluetooth, accelerometer, gyroscope, magnetometer, etc.) may be powered on.

In some examples, the low power mode does not allow the device to boot in the operating system that would execute in the high power mode. For example, in the high power mode, a first operating system having a plurality of functionalities (e.g., multitasking, network access, etc.) may be invoked. In the low power mode, a second operating system having only a subset of the plurality of functionalities of the first operating system (e.g., displaying a current time, playing an alarm sound when the current time is an alarm time, using NFC, among other possibilities) may be invoked.

Figure 2B:
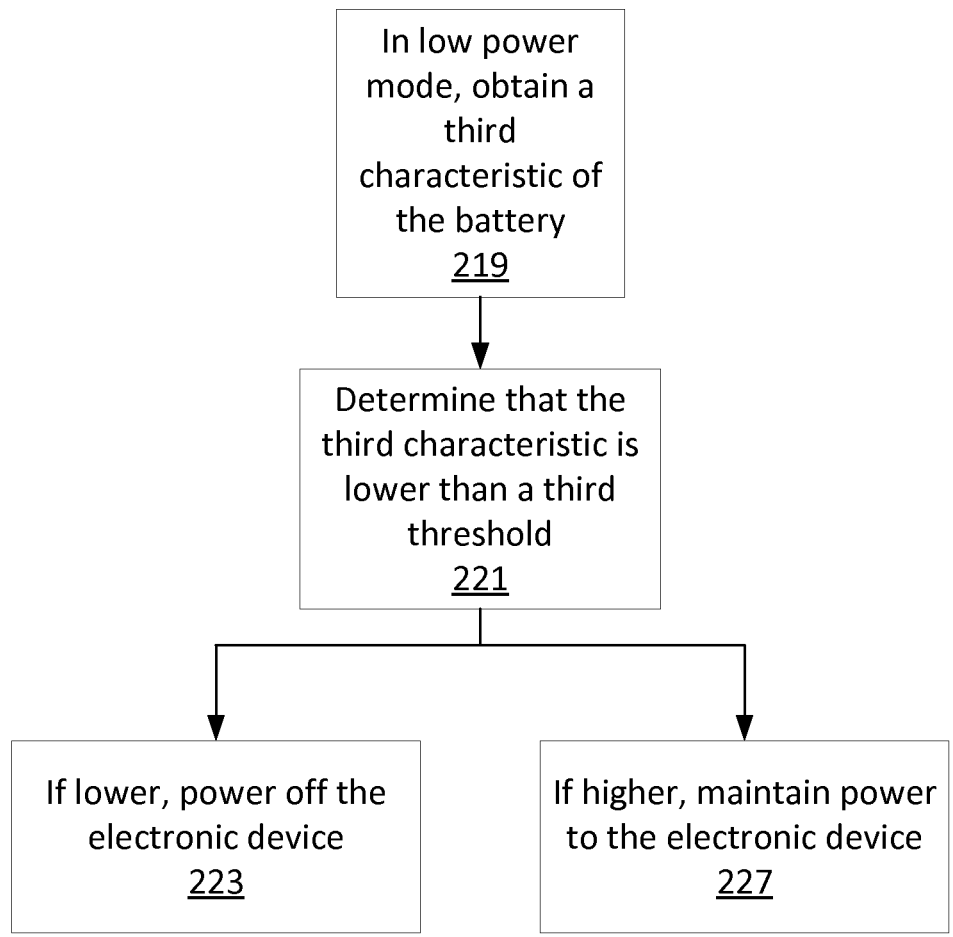

FIG. 2B illustrates an exemplary method of managing a low power mode of an electronic device, according to examples of the disclosure. In some examples, in the low power mode, a third characteristic of the battery may be obtained (219) (e.g., a voltage level, a charge level, or some other measure that may relate to the remaining capacity of the battery). It may be determined whether the third characteristic is lower than a third threshold (221) (e.g., a different UVLO threshold for the low power mode, lower than the initial UVLO threshold). In accordance with a determination that the third characteristic is lower than the third threshold, the device may be powered off (223). In accordance with a determination that the third characteristic is higher than the third threshold, power to the electronic device may be maintained (227).

In an illustrative example, an electronic device is used until the battery level falls below 10%. In response to the battery level falling below 10%, the device powers off, ready to be booted in the low power mode. When a user presses a button or otherwise interacts with the device (e.g., to check the time), the device boots in the low power mode, displays the time, and then powers off. The user charges the device to 15%, then presses a button on the device, the device again boots in the low power mode. However, once the device is charged above 18% and the user presses a button on the device, the device boots in the high power mode and additional functionality is restored.

In some examples, instead of powering off, the electronic device may automatically reboot in the low power mode in response to the battery level falling below 10% (without further user interaction). The device may remain powered on in the low power mode until the charge goes above 18%, at which point the device automatically reboots in the high power mode (without further user interaction).

The examples discussed above can be implemented in one or more Application Programming Interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The above-described features can be implemented as part of an application program interface (API) that can allow it to be incorporated into different applications (e.g., spreadsheet apps) utilizing touch input as an input mechanism. An API can allow a developer of an API-calling component (which may be a third party developer) to leverage specified features, such as those described above, provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some examples, the API-implementing component may provide more than one API, each providing a different view of the functionality implemented by the API-implementing component, or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other examples the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some examples, an API may allow a client program to use the services provided by a Software Development Kit (SDK) library. In other examples an application or other client program may use an API provided by an Application Framework. In these examples the application or client program may incorporate calls to functions or methods provided by the SDK and provided by the API or use data types or objects defined in the SDK and provided by the API. An Application Framework may in these examples provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one example, call APIs from different providers such as a set of APIs from an OS provider and another set of APIs from a plug-in provider and another set of APIs from another provider (e.g. the provider of a software library) or creator of the another set of APIs.

Figure 3:
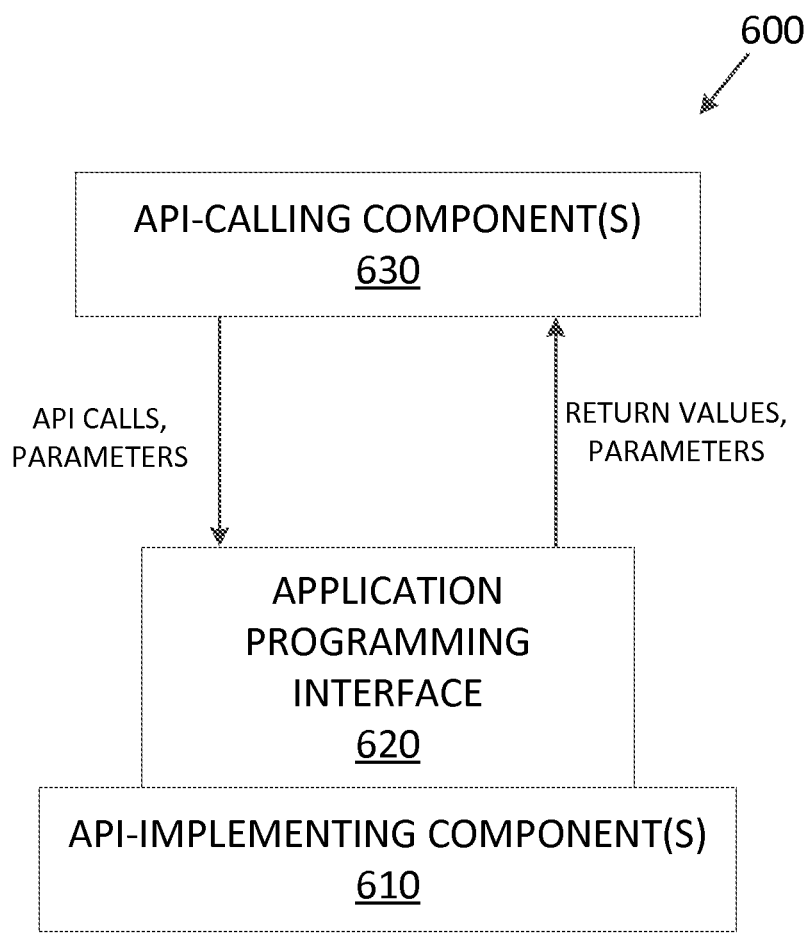
FIG. 3 is a block diagram illustrating an exemplary API architecture, which may be used in some examples of the disclosure.

FIG. 3 is a block diagram illustrating an exemplary API architecture, which may be used in some examples of the disclosure. As shown in FIG. 3, the API architecture 600 includes the API-implementing component 610 (e.g., an operating system, a library, a device driver, an API, an application program, software or other module) that implements the API 620. The API 620 specifies one or more functions, methods, classes, objects, protocols, data structures, formats and/or other features of the API-implementing component that may be used by the API-calling component 630. The API 620 can specify at least one calling convention that specifies how a function in the API-implementing component receives parameters from the API-calling component and how the function returns a result to the API-calling component. The API-calling component 630 (e.g., an operating system, a library, a device driver, an API, an application program, software or other module), makes API calls through the API 620 to access and use the features of the API-implementing component 610 that are specified by the API 620. The API-implementing component 610 may return a value through the API 620 to the API-calling component 630 in response to an API call.

It will be appreciated that the API-implementing component 610 may include additional functions, methods, classes, data structures, and/or other features that are not specified through the API 620 and are not available to the API-calling component 630. It should be understood that the API-calling component 630 may be on the same system as the API-implementing component 610 or may be located remotely and accesses the API-implementing component 610 using the API 620 over a network. While FIG. 3 illustrates a single API-calling component 630 interacting with the API 620, it should be understood that other API-calling components, which may be written in different languages (or the same language) than the API-calling component 630, may use the API 620.

The API-implementing component 610, the API 620, and the API-calling component 630 may be stored in a non-transitory machine-readable storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 4:
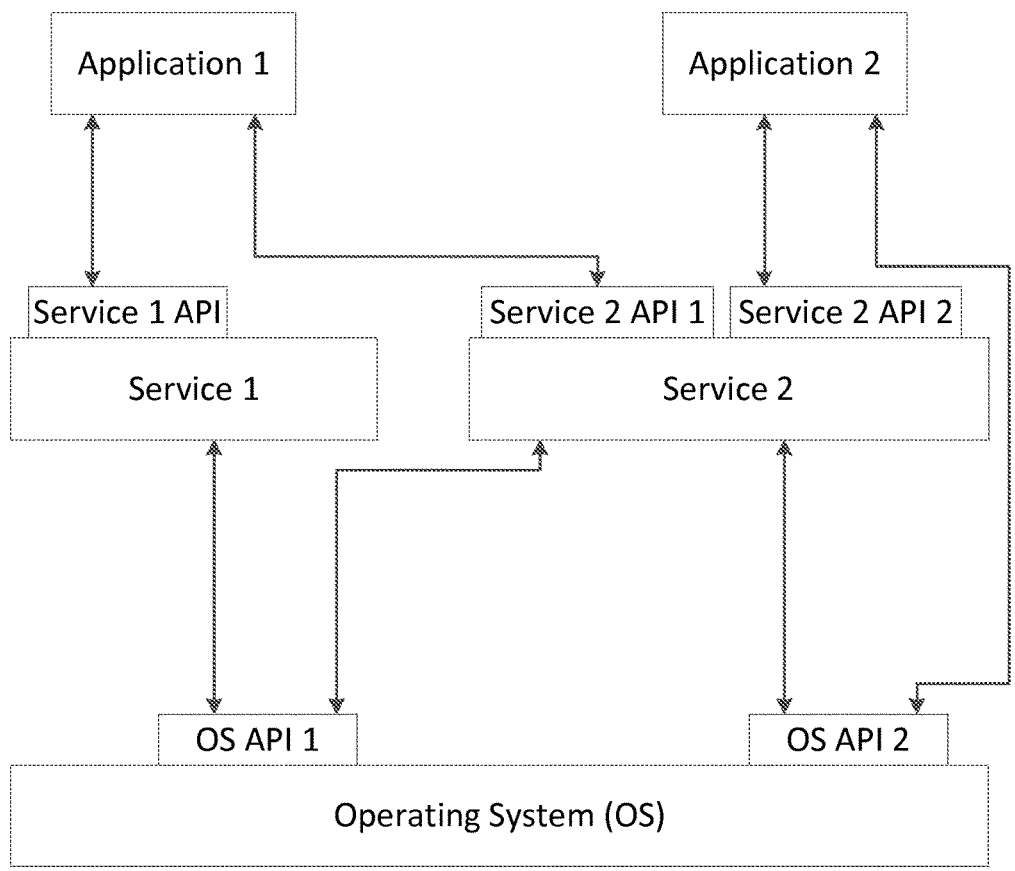
FIG. 4 illustrates an exemplary software stack of an API according to examples of the disclosure.

In the exemplary software stack shown in FIG. 4, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 5:
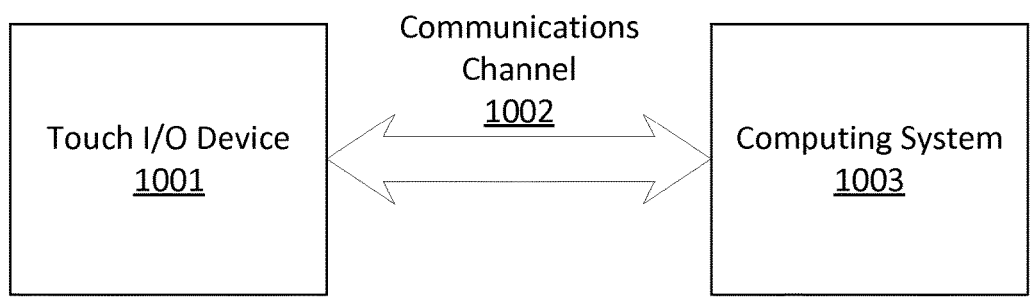
FIG. 5 is a block diagram illustrating exemplary interactions between the touch screen and other components of the device according to examples of the disclosure.

FIG. 5 is a block diagram illustrating exemplary interactions between the touch screen and the other components of the device. Described examples may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a smartphone or a tablet PC) or may be separate from computing system 1003.

Touch I/O device 1001 may include a touch sensing panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensing surface for receiving touch input.

In one example, touch I/O device 1001 embodied as a touch screen may include a transparent and/or semitransparent touch sensing panel partially or wholly positioned over at least a portion of a display. According to this example, touch I/O device 1001 functions to display graphical data transmitted from computing system 1003 (and/or another source) and also functions to receive user input. In other examples, touch I/O device 1001 may be embodied as an integrated touch screen where touch sensing components/devices are integral with display components/devices. In still other examples a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other examples, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other examples in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 6:
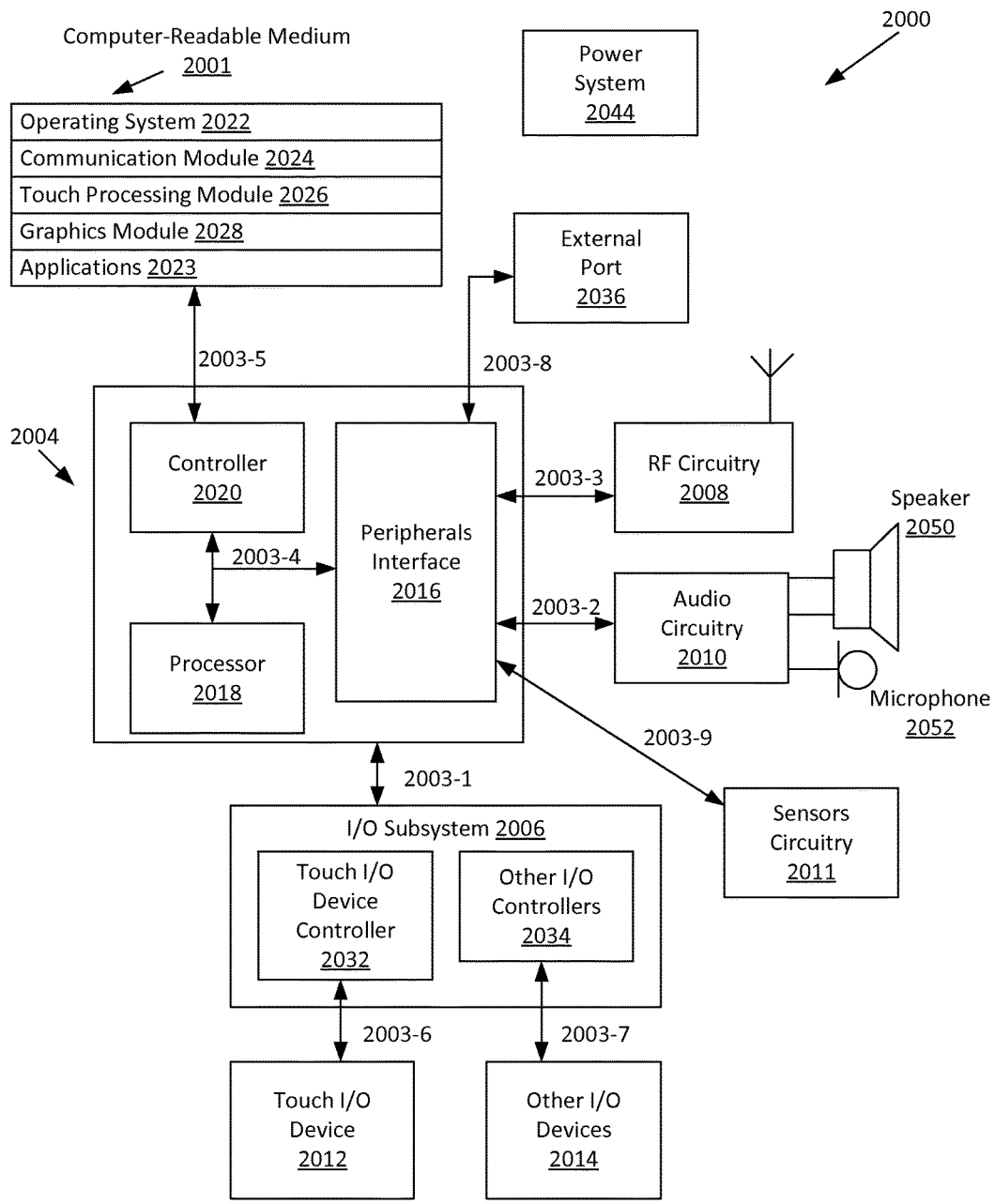
FIG. 6 is a block diagram illustrating an example of a system architecture that may be embodied within any portable or non-portable device according to examples of the disclosure.

Attention is now directed towards examples of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 6 is a block diagram of one example of system 2000 that generally includes one or more computer-readable mediums 2001, processing system 2004, I/O subsystem 2006, radio frequency (RF) circuitry 2008, audio circuitry 2010, and sensors circuitry 2011. These components may be coupled by one or more communication buses or signal lines 2003.

It should be apparent that the architecture shown in FIG. 6 is only one example architecture of system 2000, and that system 2000 could have more or fewer components than shown, or a different configuration of components. The various components shown in FIG. 6 can be implemented in hardware, software, firmware or any combination thereof, including one or more signal processing and/or application specific integrated circuits.

RF circuitry 2008 can be used to send and receive information over a wireless link or network to one or more other devices and includes well-known circuitry for performing this function. RF circuitry 2008 and audio circuitry 2010 can be coupled to processing system 2004 via peripherals interface 2016. Interface 2016 can include various known components for establishing and maintaining communication between peripherals and processing system 2004. Audio circuitry 2010 can be coupled to audio speaker 2050 and microphone 2052 and can include known circuitry for processing voice signals received from interface 2016 to enable a user to communicate in real-time with other users. In some examples, audio circuitry 2010 can include a headphone jack (not shown). Sensors circuitry 2011 can be coupled to various sensors including, but not limited to, one or more Light Emitting Diodes (LEDs) or other light emitters, one or more photodiodes or other light sensors, one or more photothermal sensors, a magnetometer, an accelerometer, a gyroscope, a barometer, a compass, a proximity sensor, a camera, an ambient light sensor, a thermometer, a GPS sensor, and various system sensors which can sense remaining battery life, power consumption, processor speed, CPU load, and the like.

Peripherals interface 2016 can couple the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. In some examples, medium 2001 can be a non-transitory computer-readable storage medium. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 can run various software components stored in medium 2001 to perform various functions for system 2000. In some examples, the software components can include operating system 2022, communication module (or set of instructions) 2024, touch processing module (or set of instructions) 2026, graphics module (or set of instructions) 2028, and one or more applications (or set of instructions) 2030. Each of these modules and above noted applications can correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various examples. In some examples, medium 2001 may store a subset of the modules and data structures identified above. Furthermore, medium 2001 may store additional modules and data structures not described above.

Operating system 2022 can include various procedures, sets of instructions, software components and/or drivers for controlling and managing general system tasks (e.g., memory management, storage device control, power management, etc.) and facilitates communication between various hardware and software components.

Communication module 2024 can facilitate communication with other devices over one or more external ports 2036 or via RF circuitry 2008 and can include various software components for handling data received from RF circuitry 2008 and/or external port 2036.

Graphics module 2028 can include various known software components for rendering, animating and displaying graphical objects on a display surface. In examples in which touch I/O device 2012 is a touch sensing display (e.g., touch screen), graphics module 2028 can include components for rendering, displaying, and animating objects on the touch sensing display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 can include various software components for performing various tasks associated with touch I/O device 2012 including but not limited to receiving and processing touch input received from I/O device 2012 via touch I/O device controller 2032.

I/O subsystem 2006 can be coupled to touch I/O device 2012 and one or more other I/O devices 2014 for controlling or performing various functions. Touch I/O device 2012 can communicate with processing system 2004 via touch I/O device controller 2032, which can include various components for processing user touch input (e.g., scanning hardware). One or more other input controllers 2034 can receive/send electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 can display visual output to the user in a GUI. The visual output may include text, graphics, video, and any combination thereof. Some or all of the visual output may correspond to user-interface objects. Touch I/O device 2012 can form a touch sensing surface that accepts touch input from the user. Touch I/O device 2012 and touch screen controller 2032 (along with any associated modules and/or sets of instructions in medium 2001) can detect and track touches or near touches (and any movement or release of the touch) on touch I/O device 2012 and can convert the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensing surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

In examples for which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other examples.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 can also include power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some examples, peripherals interface 2016, one or more processors 2018, and memory controller 2020 may be implemented on a single chip, such as processing system 2004. In some other examples, they may be implemented on separate chips.

Examples of the disclosure can be advantageous in enabling a low power mode with a UVLO threshold lower than the UVLO threshold in the high power mode, thereby allowing the device to be used for a longer period of time.

In some examples, a method of an electronic device including a battery is disclosed. The method may include: obtaining a first characteristic of the battery; determining that the first characteristic is lower than a first threshold; in accordance with a determination that the first characteristic is lower than the first threshold, enabling a low power mode; initiating a booting process; obtaining a second characteristic of the battery; determining whether the second characteristic is lower than a second threshold; in accordance with a determination that the second characteristic is lower than the second threshold, continuing the booting process according to the low power mode; and in accordance with a determination that the second characteristic is higher than the second threshold, continuing the booting process according to a high power mode. Additionally or alternatively to one or more of the above examples, the method may further include: in the low power mode, only powering on a subset of modules of the electronic device; and in the high power mode, powering on the subset of modules of the electronic device and powering on one or more additional modules of the electronic device. Additionally or alternatively to one or more of the above examples, the method may further include: in the high power mode, invoking a first operating system having a plurality of functionalities; and in the low power mode, invoking a second operating system having only a subset of the plurality of functionalities of the first operating system. Additionally or alternatively to one or more of the above examples, enabling the low power mode may include: setting a low power mode flag before initiating the booting process; storing a local time offset; and storing an alarm time. Additionally or alternatively to one or more of the above examples, the method may further include, in the low power mode: obtaining a current time; applying the local time offset to the current time to obtain a local time;

and displaying the local time. Additionally or alternatively to one or more of the above examples, the method may further include, in the low power mode: determining that a current time is the alarm time; and in accordance with a determination that the current time is the alarm time, playing an alarm sound. Additionally or alternatively to one or more of the above examples, the second threshold may be different from the first threshold. Additionally or alternatively to one or more of the above examples, the method may further include: in the low power mode, obtaining a third characteristic of the battery; determining that the third characteristic is lower than a third threshold; and in accordance with a determination that the third characteristic is lower than the third threshold, powering off the device.

In some examples, a non-transitory computer readable storage medium storing one or more programs is disclosed. The one or more programs may include instructions, which when executed by an electronic device including a battery, cause the electronic device to perform a method including: obtaining a first characteristic of the battery; determining that the first characteristic is lower than a first threshold; in accordance with a determination that the first characteristic is lower than the first threshold, enabling a low power mode; initiating a booting process; obtaining a second characteristic of the battery; determining whether the second characteristic is lower than a second threshold; in accordance with a determination that the second characteristic is lower than the second threshold, continuing the booting process according to the low power mode; and in accordance with a determination that the second characteristic is higher than the second threshold, continuing the booting process according to a high power mode. Additionally or alternatively to one or more of the above examples, the method may further include: in the low power mode, only powering on a subset of modules of the electronic device; and in the high power mode, powering on the subset of modules of the electronic device and powering on one or more additional modules of the electronic device. Additionally or alternatively to one or more of the above examples, the method may further include: in the high power mode, invoking a first operating system having a plurality of functionalities; and in the low power mode, invoking a second operating system having only a subset of the plurality of functionalities of the first operating system. Additionally or alternatively to one or more of the above examples, enabling the low power mode may include: setting a low power mode flag before initiating the booting process; storing a local time offset; and storing an alarm time. Additionally or alternatively to one or more of the above examples, the method may further include, in the low power mode: obtaining a current time; applying the local time offset to the current time to obtain a local time; and displaying the local time. Additionally or alternatively to one or more of the above examples, the method may further include, in the low power mode: determining that a current time is the alarm time; and in accordance with a determination that the current time is the alarm time, playing an alarm sound. Additionally or alternatively to one or more of the above examples, the second threshold may be different from the first threshold. Additionally or alternatively to one or more of the above examples, the method may further include: in the low power mode, obtaining a third characteristic of the battery; determining that the third characteristic is lower than a third threshold; and in accordance with a determination that the third characteristic is lower than the third threshold, powering off the device.

In some examples, an electronic device is disclosed. The electronic device may include: one or more processors; memory; a battery; and one or more programs, wherein the one or more programs may be stored in the memory and configured to be executed by the one or more processors, which when executed by the one or more processors, cause the electronic device to perform a method including: obtaining a first characteristic of the battery; determining that the first characteristic is lower than a first threshold; in accordance with a determination that the first characteristic is lower than the first threshold, enabling a low power mode; initiating a booting process; obtaining a second characteristic of the battery; determining whether the second characteristic is lower than a second threshold; in accordance with a determination that the second characteristic is lower than the second threshold, continuing the booting process according to the low power mode; and in accordance with a determination that the second characteristic is higher than the second threshold, continuing the booting process according to a high power mode. Additionally or alternatively to one or more of the above examples, the method may further include: in the low power mode, only powering on a subset of modules of the electronic device; and in the high power mode, powering on the subset of modules of the electronic device and powering on one or more additional modules of the electronic device. Additionally or alternatively to one or more of the above examples, the method may further include: in the high power mode, invoking a first operating system having a plurality of functionalities; and in the low power mode, invoking a second operating system having only a subset of the plurality of functionalities of the first operating system. Additionally or alternatively to one or more of the above examples, enabling the low power mode may include: setting a low power mode flag before initiating the booting process; storing a local time offset; and storing an alarm time. Additionally or alternatively to one or more of the above examples, the method may further include, in the low power mode: obtaining a current time; applying the local time offset to the current time to obtain a local time; and displaying the local time. Additionally or alternatively to one or more of the above examples, the method may further include, in the low power mode: determining that a current time is the alarm time; and in accordance with a determination that the current time is the alarm time, playing an alarm sound. Additionally or alternatively to one or more of the above examples, the second threshold may be different from the first threshold. Additionally or alternatively to one or more of the above examples, the method may further include: in the low power mode, obtaining a third characteristic of the battery; determining that the third characteristic is lower than a third threshold; and in accordance with a determination that the third characteristic is lower than the third threshold, powering off the device.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method of an electronic device including a display and a battery, the method comprising:
  obtaining a first characteristic of the battery;
  determining that the first characteristic is lower than a first threshold;
  in accordance with a determination that the first characteristic is lower than the first threshold, enabling a low power mode;

after enabling the low power mode, initiating a booting process;

obtaining a second characteristic of the battery;

determining whether the second characteristic is lower than a second threshold, equal to or higher than the first threshold;

in accordance with a determination that the second characteristic is lower than the second threshold, continuing the booting process according to the low power mode and storing authorization information for performing one or more wireless transactions that require the authorization information; and in accordance with a determination that the second characteristic is higher than the second threshold, continuing the booting process according to a high power mode, wherein:
in the high power mode, the electronic device is configured to perform a first set of functions, including performing the one or more wireless transactions, and in the low power mode, the electronic device is configured to perform only a second set of functions, a subset of the first set of functions and including fewer functions than the first set of functions, including performing the one or more wireless transactions using the stored authorization information.

2. The method of claim 1, the method further comprising:
in the low power mode, only powering on a subset of modules of the electronic device; and
in the high power mode, powering on the subset of modules of the electronic device and powering on one or more additional modules of the electronic device.

3. The method of claim 1, the method further comprising:
in the high power mode, invoking a first operating system configured to perform the first set of functions; and
in the low power mode, invoking a second operating system configured to perform only the second set of functions, a subset of the first set of functions and including fewer functions than the first set of functions.

4. The method of claim 1, wherein enabling the low power mode includes:
setting a low power mode flag before initiating the booting process; and
storing a local time offset from a reference time, the reference time different than a local time at the electronic device, and the local time offset reflecting a difference between the reference time and the local time;
wherein in the low power mode, the electronic device is configured to display the local time at the display of the electronic device by determining a current reference time, and applying the stored local time offset to the current reference time to obtain the local time.

5. The method of claim 4, the method further comprising, in the low power mode:
obtaining the current reference time;
applying the local time offset to the current reference time to obtain the local time at the electronic device; and
displaying, on the display, the local time at the electronic device.

6. The method of claim 4, the method further comprising, in the low power mode:
determining that a current time is an alarm time; and
in accordance with a determination that the current time is the alarm time, playing an alarm sound.

7. The method of claim 1, wherein the second threshold is higher than the first threshold.

8. The method of claim 1, the method further comprising:
in the low power mode, obtaining a third characteristic of the battery;
determining that the third characteristic is lower than a third threshold; and
in accordance with a determination that the third characteristic is lower than the third threshold, powering off the device.

9. A non-transitory computer readable storage medium storing one or more programs, the one or more programs comprising instructions, which when executed by an electronic device including a display and a battery, cause the electronic device to perform a method comprising:
obtaining a first characteristic of the battery;
determining that the first characteristic is lower than a first threshold;
in accordance with a determination that the first characteristic is lower than the first threshold, enabling a low power mode;
after enabling the low power mode, initiating a booting process;
obtaining a second characteristic of the battery;
determining whether the second characteristic is lower than a second threshold, equal to or higher than the first threshold;
in accordance with a determination that the second characteristic is lower than the second threshold, continuing the booting process according to the low power mode and storing authorization information for performing one or more wireless transactions that require the authorization information; and
in accordance with a determination that the second characteristic is higher than the second threshold, continuing the booting process according to a high power mode,
wherein:
in the high power mode, the electronic device is configured to perform a first set of functions, including performing the one or more wireless transactions, and
in the low power mode, the electronic device is configured to perform only a second set of functions, a subset of the first set of functions and including fewer functions than the first set of functions, including performing the one or more wireless transactions using the stored authorization information.

10. The non-transitory computer readable storage medium of claim 9, the method further comprising:
in the low power mode, only powering on a subset of modules of the electronic device; and
in the high power mode, powering on the subset of modules of the electronic device and powering on one or more additional modules of the electronic device.

11. The non-transitory computer readable storage medium of claim 9, the method further comprising:
in the high power mode, invoking a first operating system configured to perform the first set of functions; and
in the low power mode, invoking a second operating system configured to perform the second set of functions, a subset of the first set of functions and including fewer functions than the first set of functions.

12. The non-transitory computer readable storage medium of claim 9, wherein enabling the low power mode includes:
setting a low power mode flag before initiating the booting process; and storing a local time offset from a reference time, the reference time different than a local time at the electronic device, and the local time offset reflecting a difference between the reference time and the local time;

wherein in the low power mode, the electronic device is configured to display the local time at the display of the electronic device by determining a current reference time, and applying the stored local time offset to the current reference time to obtain the local time.

13. The non-transitory computer readable storage medium of claim 12, the method further comprising, in the low power mode:

obtaining the current reference time;

applying the local time offset to the current reference time to obtain the local time at the electronic device; and displaying, on the display, the local time at the electronic device.

14. The non-transitory computer readable storage medium of claim 12, the method further comprising, in the low power mode:

determining that a current time is an alarm time; and in accordance with a determination that the current time is the alarm time, playing an alarm sound.

15. The non-transitory computer readable storage medium of claim 9, wherein the second threshold is higher than the first threshold.

16. The non-transitory computer readable storage medium of claim 9, the method further comprising:

in the low power mode, obtaining a third characteristic of the battery;

determining that the third characteristic is lower than a third threshold; and in accordance with a determination that the third characteristic is lower than the third threshold, powering off the device.

17. An electronic device, comprising:

one or more processors;

memory;

a display;

a battery; and one or more programs, wherein the one or more programs are stored in the memory and configured to be executed by the one or more processors, which when executed by the one or more processors, cause the electronic device to perform a method comprising:

obtaining a first characteristic of the battery;

determining that the first characteristic is lower than a first threshold;

in accordance with a determination that the first characteristic is lower than the first threshold, enabling a low power mode;

after enabling the low power mode, initiating a booting process;

obtaining a second characteristic of the battery;

determining whether the second characteristic is lower than a second threshold, equal to or higher than the first threshold;

in accordance with a determination that the second characteristic is lower than the second threshold, continuing the booting process according to the low power mode and storing authorization information for performing one or more wireless transactions that require the authorization information; and in accordance with a determination that the second characteristic is higher than the second threshold, continuing the booting process according to a high power mode, wherein:

in the high power mode, the electronic device is configured to perform a first set of functions, including performing the one or more wireless transactions, and in the low power mode, the electronic device is configured to perform only a second set of functions, a subset of the first set of functions and including fewer functions than the first set of functions, including performing the one or more wireless transactions using the stored authorization information.

18. The electronic device of claim 17, the method further comprising:

in the low power mode, only powering on a subset of modules of the electronic device; and in the high power mode, powering on the subset of modules of the electronic device and powering on one or more additional modules of the electronic device.

19. The electronic device of claim 17, the method further comprising:

in the high power mode, invoking a first operating system configured to perform the first set of functions; and in the low power mode, invoking a second operating system configured to perform only the second set of functions, a subset of the first set of functions and including fewer functions than the first set of functions.

20. The electronic device of claim 17, wherein enabling the low power mode includes:

setting a low power mode flag before initiating the booting process; and storing a local time offset from a reference time, the reference time different than a local time at the electronic device, and the local time offset reflecting a difference between the reference time and the local time;

wherein in the low power mode, the electronic device is configured to display the local time at the display of the electronic device by determining a current reference time, and applying the stored local time offset to the current reference time to obtain the local time.

21. The electronic device of claim 20, the method further comprising, in the low power mode:

obtaining the current reference time;

applying the local time offset to the current reference time to obtain the local time at the electronic device; and displaying, on the display, the local time at the electronic device.

22. The method of claim 1, wherein the wireless transactions are payment transactions.

23. The non-transitory computer readable storage medium of claim 9, wherein the wireless transactions are payment transactions.

24. The electronic device of claim 17, wherein the wireless transactions are payment transactions.

25. The electronic device of claim 20, the method further comprising, in the low power mode:

determining that a current time is an alarm time; and in accordance with a determination that the current time is the alarm time, playing an alarm sound.

26. The electronic device of claim 17, wherein the second threshold is higher than the first threshold.

27. The electronic device of claim 17, the method further comprising:

in the low power mode, obtaining a third characteristic of the battery;

determining that the third characteristic is lower than a third threshold; and in accordance with a determination that the third characteristic is lower than the third threshold, powering off the device.

* * * * *